(12) United States Patent
Goodzeit et al.

(10) Patent No.: US 7,246,775 B1
(45) Date of Patent: Jul. 24, 2007

(54) SYSTEM AND METHOD OF SUBSTANTIALLY AUTONOMOUS GEOSYNCHRONOUS TIME-OPTIMAL ORBIT TRANSFER

(75) Inventors: Neil Evan Goodzeit, Princeton, NJ (US); Santosh Ratan, Highland Park, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 60 days.

(21) Appl. No.: 10/903,653

(22) Filed: Aug. 2, 2004

(51) Int. Cl.
*B64G 1/24* (2006.01)
(52) U.S. Cl. .................................................... 244/164
(58) Field of Classification Search ............. 244/158.4, 244/158.5, 158.6, 164
See application file for complete search history.

(56) References Cited

U.S. PATENT DOCUMENTS

| | | | |
|---|---|---|---|
| 5,109,346 A * | 4/1992 | Wertz | 701/226 |
| 5,546,309 A * | 8/1996 | Johnson et al. | 701/13 |
| 6,131,058 A * | 10/2000 | Boeinghoff et al. | 701/34 |
| 6,142,423 A * | 11/2000 | Wehner | 244/164 |
| 6,145,790 A * | 11/2000 | Didinsky et al. | 244/164 |
| 6,157,891 A * | 12/2000 | Lin | 701/301 |
| 6,186,446 B1 * | 2/2001 | Tilley et al. | 244/164 |
| 6,317,688 B1 * | 11/2001 | Bruckner et al. | 701/213 |
| 6,456,906 B1 * | 9/2002 | Hua | 701/13 |
| 6,508,438 B2 * | 1/2003 | Eyerly | 244/164 |
| 6,596,976 B2 * | 7/2003 | Lin et al. | 244/3.2 |
| 6,685,142 B1 * | 2/2004 | Fichter et al. | 244/171 |
| 6,695,263 B1 | 2/2004 | Goodzeit | |
| 6,921,051 B2 * | 7/2005 | Lopata et al. | 244/158.9 |
| 2002/0171011 A1 * | 11/2002 | Lopata et al. | 244/172 |
| 2005/0040280 A1 * | 2/2005 | Hua | 244/3.1 |

* cited by examiner

*Primary Examiner*—Teri Pham Luu
*Assistant Examiner*—Stephen A Holzen
(74) *Attorney, Agent, or Firm*—McDermott Will & Emery LLP.

(57) ABSTRACT

Method of and system for on-board substantially autonomous control for transferring a spacecraft from an initial orbit to a final geosynchronous orbit, by a trajectory that minimizes remaining transfer time and orbit transfer fuel. The spacecraft determines its orbit using a GPS-based system to determine the spacecraft orbital elements. Based on the measured orbit error, corrected co-state parameters are calculated and used to generate an updated thrust trajectory. The corrections are calculated using an innovative numerical procedure, carried out repetitively at a fixed interval until the target geosynchronous orbit is achieved.

17 Claims, 4 Drawing Sheets

SYSTEM AND METHOD OF SUBSTANTIALLY AUTONOMOUS GEOSYNCHRONOUS TIME-OPTIMAL ORBIT TRANSFER

TECHNICAL FIELD

The invention relates generally to orbiting spacecraft, and particularly to an on-board, substantially autonomous propulsion control system for efficiently carrying out orbit transfer, and a method for practicing the same.

BACKGROUND

To increase the payload mass delivered to orbit, large geosynchronous spacecraft may perform an orbit transfer using high-efficiency ion propulsion. During the orbit transfer, either Hall Current Thrusters (HCTs) or Xenon Ion Thrusters (XITs) are fired nearly continuously for a period of several weeks to months. While the thrusters are fired, the spacecraft attitude is controlled so the thrust vector tracks a specified inertial trajectory vector and the solar arrays remain pointed at the sun. The orbit transfer trajectory vector may be determined by solving the well-known minimum-time continuous firing orbit transfer problem. The trajectory is determined using a computationally intensive numerical iteration procedure that is not practical to implement on-board the spacecraft. The results of the optimization are a set of parameters, known as co-states, that can be used to generate the thrust trajectory on board the spacecraft.

During actual mission operations, the spacecraft generates the orbit transfer trajectory vector using ground-supplied co-states, and follows the trajectory while firing ion thrusters to execute the orbit transfer. However, over time, the actual orbit trajectory will deviate from the ideal orbit trajectory due to the effects of thrust and mass uncertainties, attitude determination and control errors, and perturbations due to the sun, moon, and earth gravity non-uniformities. To mitigate these effects, the ground routinely performs orbit determination using ranging data collected at times when ground contact with the spacecraft is possible. Using the estimated orbit, the ground generates updated co-states that are sent to the spacecraft to compute the updated thrust trajectory that corrects the orbit. This trajectory correction procedure is repeated every several days until the orbit transfer is complete.

There are several significant drawbacks to this approach. The first is that it requires a potentially large and highly skilled ground support staff to generate the orbit determination and trajectory replans for upload to the spacecraft. This staff must support the entire orbit transfer, which can be 100 days or greater. Also, because of the need for ground contact for ranging and commanding, generally at least three ground stations widely spaced in longitude must be available. Ground stations and their support staffs are a significant mission support cost, and it is desirable to reduce the number of stations needed. Additionally, there is a practical limit to the frequency that the firing plan can be updated due to the time required to collect and process orbit determination data and perform the numerical optimization. Larger update intervals reduce the orbit transfer efficiency, because the actual trajectory will deviate to a greater extent from the ideal trajectory. This deviation results in a longer orbit transfer requiring more fuel to complete.

Finally, the upload plans and parameters must be carefully checked and verified by the ground support staff before transmission to the spacecraft. As is true with all operations involving frequent ground commanding, mistakes are possible that can have negative consequences for the mission.

SUMMARY OF THE INVENTION

The subject matter disclosed herein solves these problems by providing an on-board, substantially autonomous capability for transferring a spacecraft from an initial orbit to a final geosynchronous orbit. At any time during the orbit transfer, the planned trajectory to complete the transfer is one that minimizes the remaining transfer time and the orbit transfer fuel. The spacecraft determines its orbit using a GPS-based system, or other means, to determine spacecraft orbital elements. Based on a measured orbit error, corrected co-state parameters are calculated and used to generate an updated thrust trajectory. The corrections are calculated using an innovative numerical procedure that is computationally simple and easy to implement in flight software. The procedure is carried out repetitively at a fixed interval until the target geosynchronous orbit is achieved.

Because the system is substantially autonomous, only a small ground support staff is needed that functions primarily in a monitoring role. Also, reduced ground station coverage is possible, because of the reduced requirements for range data collection and ground commanding. Finally, the frequent updates improve fuel efficiency because the closed loop corrections reduce the deviation of the actual orbit from an ideal minimum-time orbit trajectory.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF PREFERRED EMBODIMENTS

Figure 1:
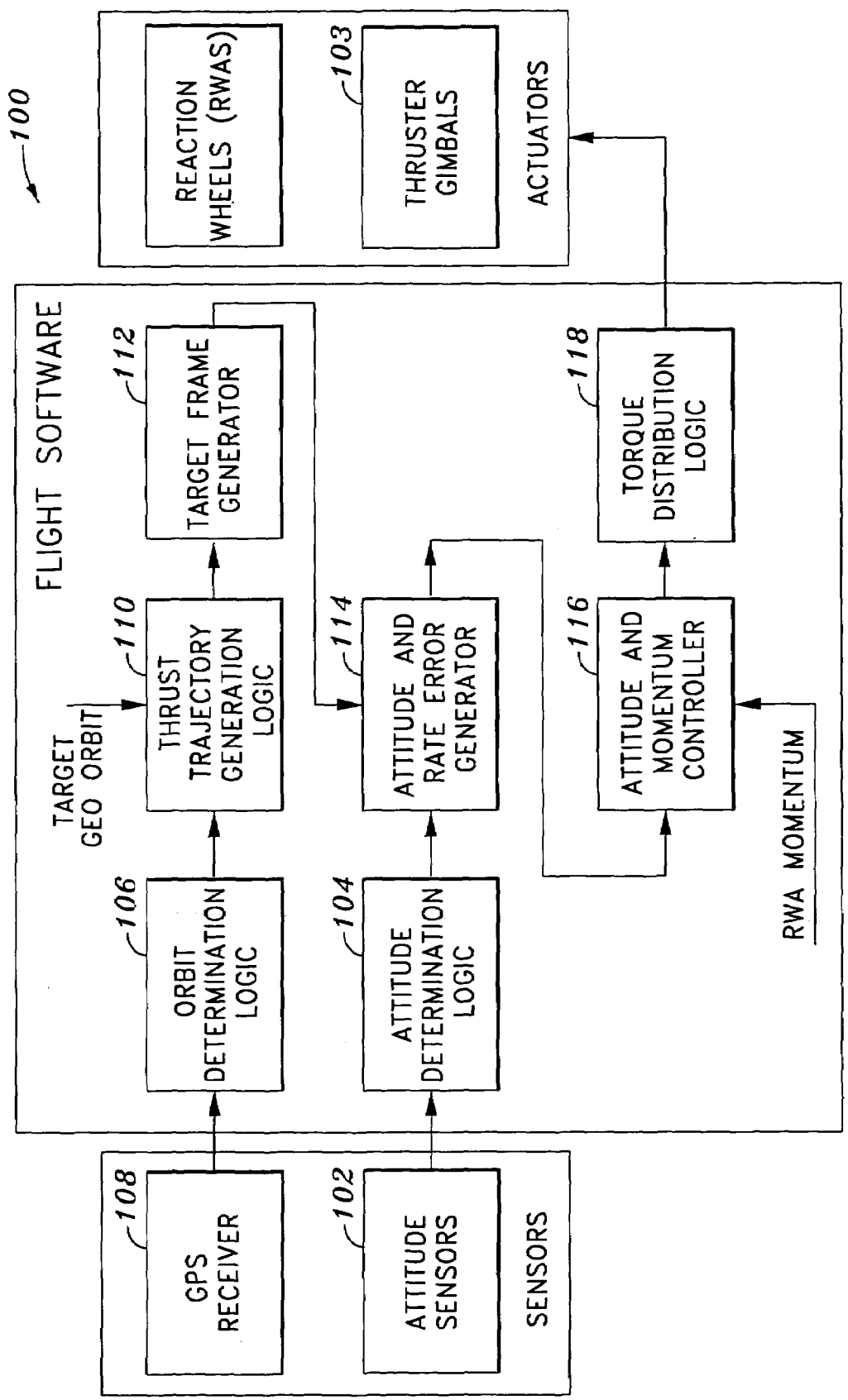
FIG. 1 is a block diagram showing an embodiment of a substantially autonomous orbit transfer control system, as taught herein.

FIG. 1 is a block diagram of a system 100 according to the invention. The system 100 is applicable to different types of spacecraft including geosynchronous spacecraft or any spacecraft that executes a time-optimal orbit transfer by continuous or near-continuous firing of thrusters.

To determine the spacecraft inertial attitude, the system 100 processes data from sensors 102, that may include earth sensors, sun sensors, star trackers, and an inertial measurement unit (IMU), all being conventional. The earth sensors, sun sensors, and star trackers provide direct attitude measurements, and the IMU provides angular rate information. This processing is carried out in an Attitude Determination Logic 104, implemented in the flight software in a preferred embodiment.

An Orbit Determination Logic 106 processes measurements from a conventional GPS receiver 108 and provides estimates of the spacecraft orbit elements based on an orbit dynamics model and knowledge of the applied thruster thrust. The GPS receiver 108 is connected to antennas that are arranged in such a way that signals from GPS spacecraft are received for a wide range of spacecraft attitudes.

The orbit elements produced by Orbit Determination Logic 106 are input to a novel Thrust Trajectory Generation Logic 110, implemented in the flight software, which computes the inertial thrust trajectory vector for orbit transfer. This logic, which is described in detail below, computes the thrust trajectory vector based on the measured orbit elements and the target GEO orbit.

The thrust trajectory vector is then input to a Target Frame Generator 112. This logic, which is also conventional, computes a target inertial reference frame, such that when the spacecraft body axes are aligned with this frame, the nominal thruster thrust direction is parallel to the thrust trajectory vector.

To ensure that target and spacecraft body frames remain aligned, an Attitude and Rate Error Generator 114 computes spacecraft attitude and rate errors with respect to the target reference frame. The attitude and rate errors, along with the reaction wheel (RWA) momentum error, are input to an Attitude and Momentum Controller 116 that computes torque commands for attitude and momentum control that are input to Torque Distribution Logic 118. This logic in turn distributes torque commands to the RWAs and the thruster gimbals 103.

Figure 2:
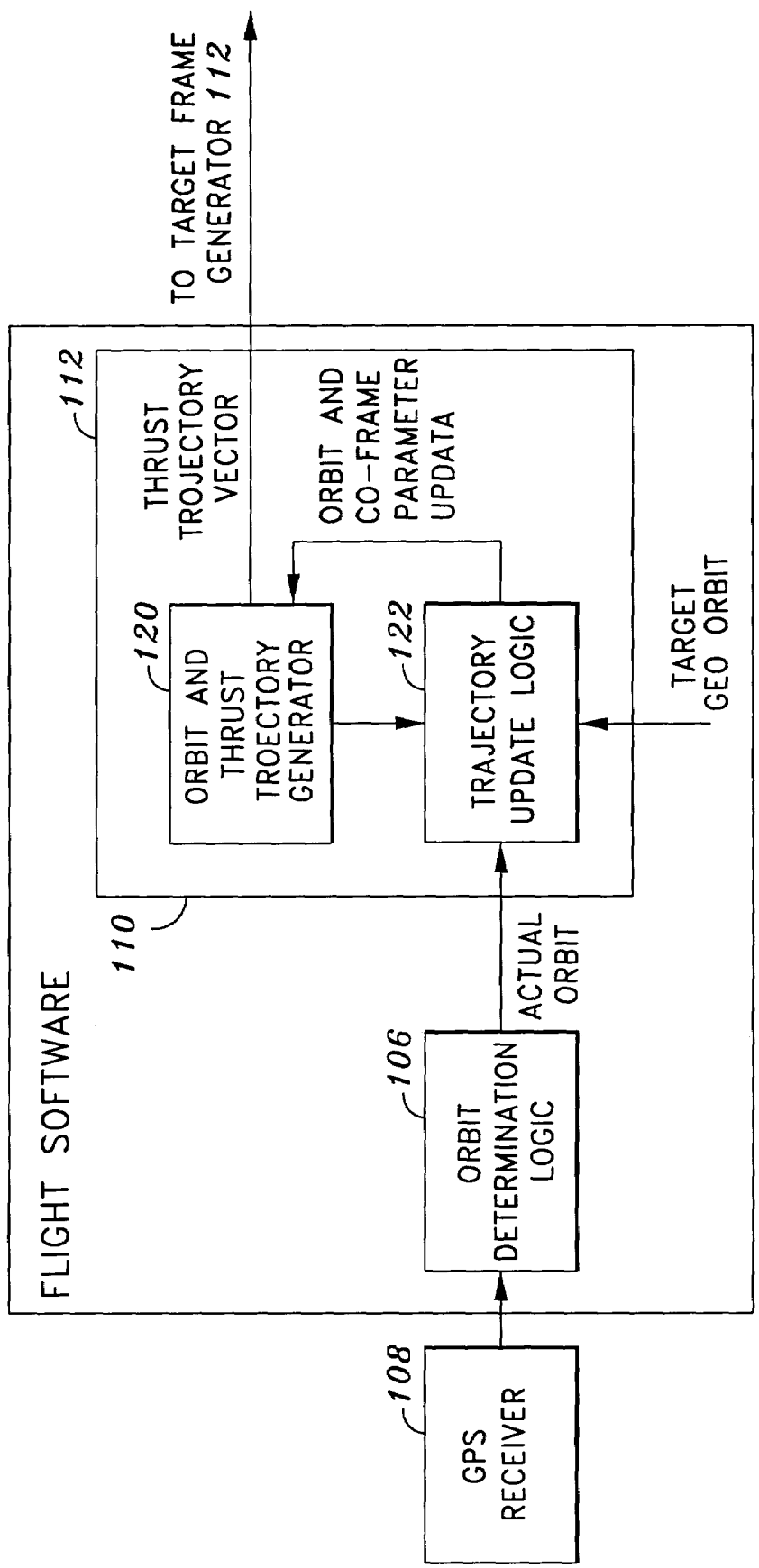
FIG. 2 is a diagram showing detail of the Thrust Trajectory Generation Logic, implemented in the system of FIG. 1.

FIG. 2 is a more detailed diagram of the Thrust Trajectory Generation Logic 110 comprising Orbit and Thrust Trajectory Generator 120 and Trajectory Update Logic 122. Orbit and Thrust Trajectory Generator 120 propagates the orbit and co-state equations and determines the 3-element thrust trajectory unit vector u that is supplied to the Target Frame Generator 112 according to:

$$\dot{z} = M(z)us + \begin{bmatrix} 0 & 0 & 0 & 0 & 0 & \frac{na}{\gamma} \end{bmatrix}^T = f(z, u, s) \quad (1)$$

$$\dot{\lambda} = -\left[\frac{\partial f}{\partial z}\right]^T \lambda$$

$$u \parallel M^T \lambda$$

where z is the 6-element orbit state vector, $\lambda$ is the 6-element co-state vector, and s is the nominal acceleration due to thruster firing. Additionally, n is the orbit mean motion, a is the orbit semi-major axis, and $\gamma$ is the distance from the spacecraft to the center of the earth. These expressions assume two-body orbit dynamics and a uniform spherical Earth. As known to those with skill in the art, these equations may be modified to include the effects of orbit perturbations due to the Sun, Moon, or earth gravity asymmetries.

At the beginning of the orbit transfer, the initial orbit elements and co-states are uploaded from the ground. The initial co-states and orbit transfer time are determined by ground-based numerical optimization. This starting orbit transfer trajectory is then modified as described below based on the actual orbit transfer performance.

The GPS receiver 108 provides data that is processed by the Orbit Determination Logic 106 within the flight software to obtain the measured orbit elements, $z_m$. Periodically, the measured orbit elements are used to update the co-state vector $\lambda$ to correct the trajectory such that the target orbit is achieved. Trajectory Update Logic 122 carries out the update steps, as follows, at some regular time interval, for example every 1, 2 or 12 hours.

Consider some time T during the orbit transfer where the update is to be carried out, and where z(T) and $\lambda$(T) are the corresponding propagated orbit elements and co-states, $z_m(T)$ are the measured orbit elements, and $T_f$ is the orbit transfer time remaining. The first step is to propagate Eq. (1) forward for the remaining transfer time $T_f$ starting from the initial conditions $z(T)=z_m(T)$ and $\lambda(T)$. This is done to determine the expected final orbit elements and their time derivatives, denoted as $z_f$ and $\dot{z}_f$. The error between the target orbit elements $z_{target}$ and the expected final orbit is then computed as $$\Delta z_f = z_{target} - z_f \quad (2)$$

The next step is to solve for the perturbations to the co-states $\Delta\lambda(T)$ and the remaining transfer time $\Delta T_f$ that eliminates the error $$\begin{bmatrix} \Delta\lambda \\ \Delta T_f \end{bmatrix} = A^T(AA^T)^{-1}\Delta z_f \quad (3)$$

where A is a 6×7 matrix that relates the perturbations to the orbit error, and that is formed as a composite of the 6×6 matrix Z and the orbit element derivative at the final time $$\Delta z_f = A\begin{bmatrix} \Delta\lambda \\ \Delta T_f \end{bmatrix} = [Q \quad \dot{z}_f]\begin{bmatrix} \Delta\lambda \\ \Delta T_f \end{bmatrix} \quad (4)$$

The matrix Q, which may be computed numerically or analytically, relates a co-state perturbation $\delta\lambda(T)$ to changes in the final orbit $\delta z_f$ $$\delta z_f = Q\delta\lambda(T) \quad (5)$$

The final step is to update the co-states and time remaining for the orbit transfer:

$$\lambda(T) = \lambda(T) + \Delta\lambda(T)$$

$$T_f = T_f + \Delta T_f \quad (6)$$

Starting from these initial conditions, Eq. (1) is then propagated to generate the thrust trajectory until the time of the next update, at which point the steps described above are repeated.

Other embodiments of the present invention will be obvious to those skilled in the art. For example, rather than using a GPS, the orbit may be determined by some other means. For example, the orbit elements may be determined on the ground using range and angle data and periodically uploaded to the spacecraft. The orbit and co-state propagation may consider continuous firing, or constraints may be imposed such that the thruster may be turned off and on at specific times.

Figure 3:
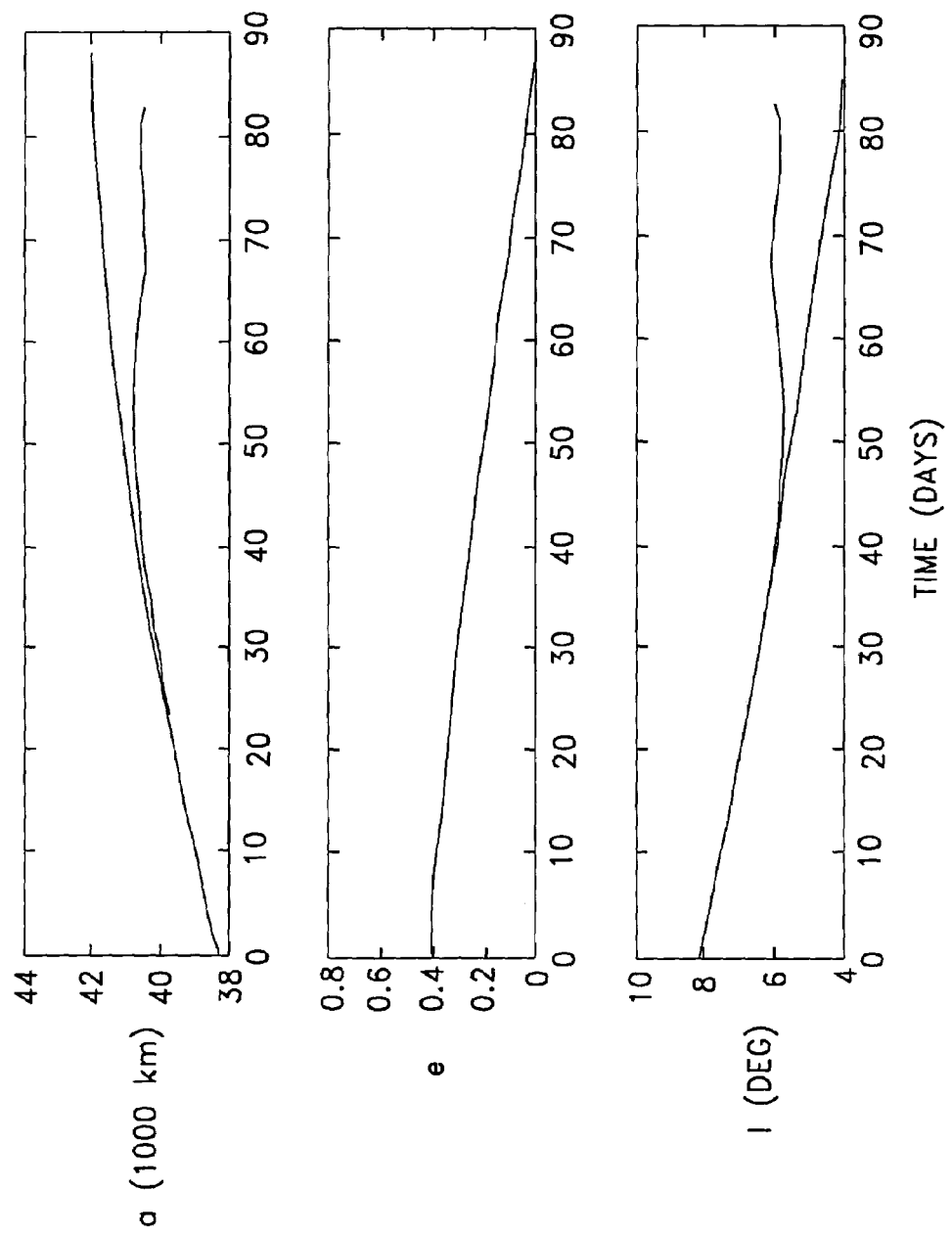
FIG. 3 is a series of graphs showing low-thrust orbit transfer, of the prior art.

FIG. 3 is a series of graphs showing a prior-art low-thrust orbit transfer using Hall Current Thrusters (HCTs). Table 1 gives the spacecraft starting orbit, final orbit, and other spacecraft parameters.

TABLE I

| Parameter | Value |
|---|---|
| Initial mass | 4400 kg |
| Thrust | 0.58N |
| Specific impulse | 1771 sec |
| Initial orbit | a = 38,364 km, e = 0.42, I = 8.3 deg, longitude = 0 deg |
| Final orbit | a = 42,264 km, e = 0, I = 4 deg, longitude = 50 deg |

The Figure shows how the actual orbit trajectory deviates from and ideal orbit trajectory because the HCT thrust is 5% lower than expected (the solid line is the ideal trajectory and the dashed line is the actual trajectory). The trajectory deviation would be observed by ground-based orbit determination, and periodically a new orbit transfer plan would be developed and uploaded to the spacecraft to correct the trajectory. Because the actual orbit trajectory deviates from an ideal trajectory, the orbit transfer will take longer at the expense of increased fuel.

Figure 4:
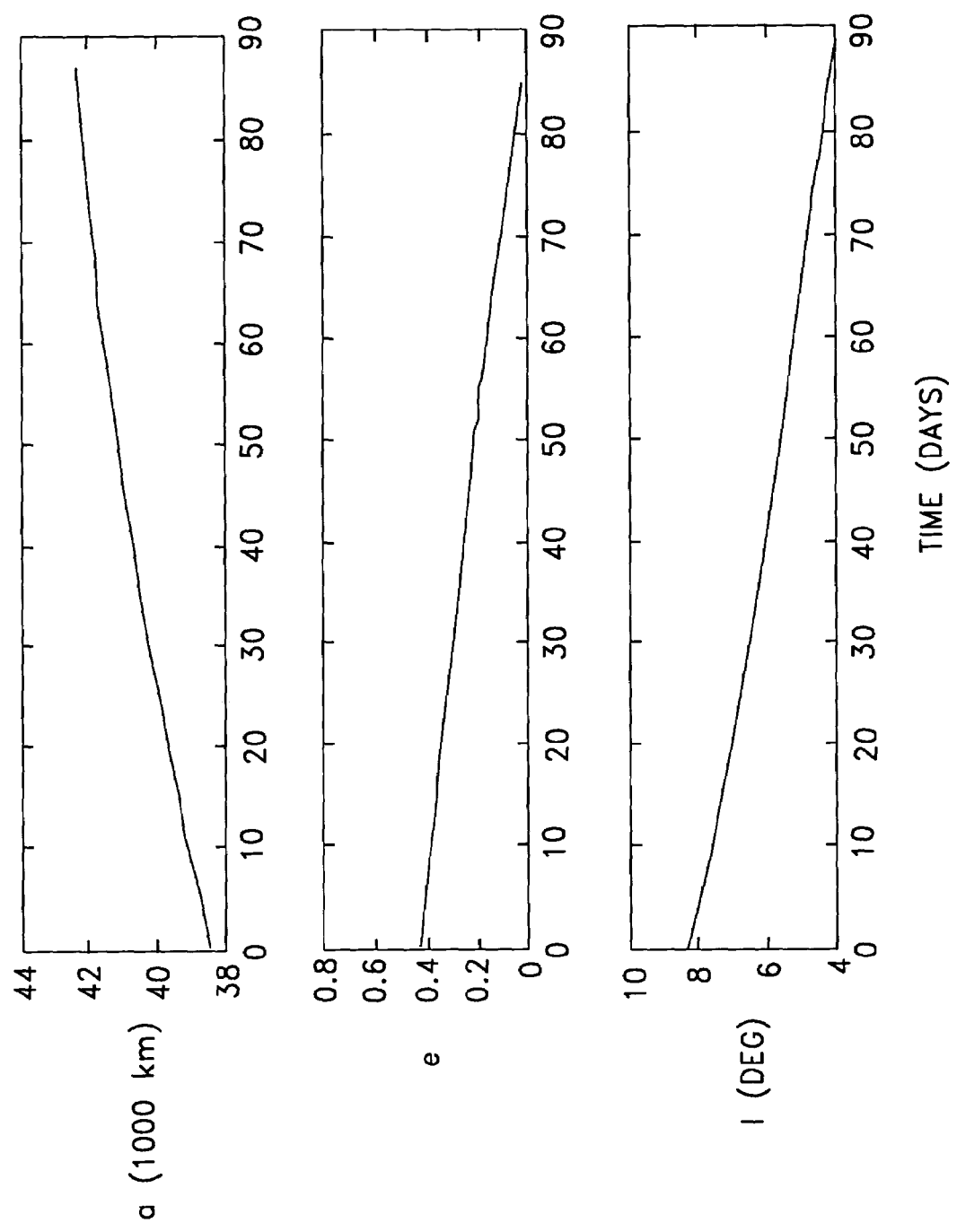
FIG. 4 is a series of graphs showing the same, in accord with the system disclosed herein.

FIG. 4 shows the same orbit transfer, but this time using a system according to the invention. As a result of the continuous on-board corrections, the actual trajectory closely tracks the optimal trajectory, resulting in only a small increase in the orbit transfer time (0.14 day).

Those skilled in the art will understand that the method and system of the present invention need not be limited to orbit transfer. For instance, the method and system of the present invention can be employed to optimally move a spacecraft from one position to another in the same orbit—e.g., from an East Coast position to a West Coast position—without departing from the scope of the present invention. Furthermore, the present invention may be utilized to maintain orbital positions once a spacecraft has reached its desired orbit.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. An on-board autonomous orbit transfer system for transferring a spacecraft from an initial orbit to a target orbit, the system comprising:
    attitude sensors;
    an inertial measurement unit;
    a GPS receiver for receiving externally produced GPS signals and outputting GPS position data signals;
    control actuators for controlling spacecraft momentum and spacecraft thrust in response to received torque commands;
    a control processing system configured to operate repetitively during the transfer of the spacecraft from the initial orbit to the target orbit, the control processing system being comprised of:
        orbit determination logic configured to receive GPS position data signals from the GPS receiver and to generate current orbit elements data;
        thrust trajectory generation logic configured to receive the current orbit elements data from the orbit determination logic and to generate an updated inertial thrust trajectory vector by propagating a set of estimated final orbit elements data from the current orbit elements data, generating a set of orbit error elements based on a difference between the estimated final orbit elements data and target orbit elements data corresponding to the target orbit, updating a co-state vector ($\lambda$) based on the orbit error elements and generating the updated inertial thrust trajectory vector based on the updated co-state vector ($\lambda$);
        target frame generator logic configured to receive the updated inertial thrust trajectory vector and to generate an updated target inertial reference frame such that a nominal thrust direction is parallel to the updated inertial thrust trajectory vector when the spacecraft body axes are aligned with the updated target inertial reference frame;
        attitude and rate error generator logic configured to receive current attitude and rate information based on signals from the attitude sensors and the inertial measurement unit, and to generate current spacecraft attitude and rate errors with respect to the updated target inertial reference frame;
        attitude and momentum controller logic configured to receive the current spacecraft attitude and rate errors and a reaction wheel momentum error, and to generate updated torque commands for attitude and momentum control of the spacecraft; and
        torque distribution logic configured to receive the updated torque commands and to distribute the updated torque commands to the control actuators for controlling the attitude and momentum of the spacecraft to align the spacecraft body axes with the updated target inertial reference frame.

2. A substantially autonomous orbit transfer system for positioning a spacecraft from an initial orbit to a target orbit, the system comprising:
    attitude sensors;
    an inertial measurement system;
    a global positioning system;
    control actuators for controlling spacecraft momentum and spacecraft thrust in response to received torque commands; and
    a control processing system that repetitively executes computer-executable steps of:
        (1) generating current orbit elements data based on GPS position data signals from the GPS receiver;

(2) generating an updated inertial thrust trajectory vector by propagating a set of estimated final orbit elements data from the current orbit elements data, generating a set of orbit error elements based on a difference between the estimated final orbit elements data and target orbit elements data corresponding to the target orbit, updating a co-state vector ($\lambda$) based on the orbit error elements and then generating the updated inertial thrust trajectory vector based on the updated co-state vector ($\lambda$);

(3) generating an updated target inertial reference frame such that a nominal thrust direction is parallel to the updated inertial thrust trajectory vector when the spacecraft body axes are aligned with the updated target inertial reference frame;

(4) generating current spacecraft attitude and rate errors with respect to the updated target inertial reference frame based on current attitude and rate information corresponding to signals from the attitude sensors and the inertial measurement unit;

(5) generating updated torque commands for attitude and momentum control of the spacecraft based on the current spacecraft attitude and rate errors and a reaction wheel momentum error; and (6) distributing the updated torque commands to the control actuators for controlling the attitude and momentum of the spacecraft to align the spacecraft body axes with the updated target inertial reference frame.

3. A substantially autonomous orbit transfer system according to claim 2, wherein the actuators comprise thruster gimbals and reaction wheel assemblies (RWAs) that control the attitude and thrust for transferring the spacecraft to the target orbit.

4. A substantially autonomous orbit transfer system according to claim 2, wherein the attitude sensors comprise one or more of earth sensors, sun sensors, and star trackers.

5. An on-board autonomous orbit transfer system for transferring a spacecraft from an initial orbit to a target orbit, the system comprising:
a mechanism for determining current orbit elements of the spacecraft; and
a control processing system that executes computer-executable steps of comparing the current orbit elements of the spacecraft with target orbit elements corresponding to the target orbit to generate an orbit error, and generating an updated thrust trajectory to reach the target orbit by updating a co-state vector ($\lambda$) based on the orbit error and then generating the updated thrust trajectory vector based on the updated co-state vector ($\lambda$).

6. The system as recited in claim 5, in which the mechanism for determining current orbit elements includes:
means for determining spacecraft attitude and angular rate information.

7. The system as recited in claim 5, in which the mechanism for determining current orbit elements includes:
celestial sensors for determining spacecraft attitude, and an inertial measurement unit for obtaining angular rate information.

8. The system as recited in claim 5, in which the mechanism for determining current orbit elements includes:
a GPS receiver for receiving externally-produced GPS signals.

9. The system as recited in claim 5, in which the computer-executable steps further include:
generating the current orbit elements based on GPS signals from a GPS receiver, and based on an orbit dynamics model and applied thruster thrust data.

10. The system as recited in claim 5, in which the computer-executable steps further include:
generating a target inertial reference frame such that a nominal thrust direction of the spacecraft is parallel to the updated thrust trajectory vector when the spacecraft body axes are aligned with the reference frame.

11. The system as recited in claim 10, in which the computer-executable steps further include:
generating spacecraft attitude and rate errors with respect to the target inertial reference frame.

12. The system as recited in claim 11, in which the computer-executable steps further include:
generating torque commands for attitude and momentum control of the spacecraft based on the attitude and rate errors.

13. The system as recited in claim 12, in which the computer-executable steps further include:
distributing the torque commands to attitude and momentum adjustment mechanism on the spacecraft.

14. The system as recited in claim 5, wherein orbit and co-state equations are propagated to update the co-state vector ($\lambda$), which is then used to generate the updated thrust trajectory vector.

15. The system as recited in claim 14, wherein the orbit and co-state equations are propagated to update the co-state vector ($\lambda$) based on periodically determined current orbit elements.

16. The system as recited in claim 14, wherein the orbit and co-state equations are propagated to update the co-state vector ($\lambda$) by:
(a) propagating the orbit equations forward for a remaining orbit transfer time $T_f$ to determine a set of expected final orbit elements;
(b) generating the orbit error based on a difference between the target orbit elements and the expected final orbit elements;
(c) determining differential adjustments to the co-state vector ($\lambda$) and the remaining transfer time $T_f$ that eliminates the orbit error; and
(d) updating the co-state vector ($\lambda$) and the remaining orbit transfer time $T_f$ based on the determined differential adjustments to the co-state vector ($\lambda$) and to the remaining transfer time $T_f$.

17. An on-board system for transferring a spacecraft from an initial orbit to a target orbit, the system comprising:
orbit elements determining means for determining current orbit elements of the spacecraft;
orbit error calculating means for calculating orbit error based on determined current orbit elements and target orbit elements corresponding to the target orbit;
corrected co-state parameters calculating means for calculating corrected co-state parameters based on the orbit error, and
thrust trajectory calculating means for generating an updated thrust trajectory based on the corrected co-state parameters, the updated thrust trajectory being optimized for minimization of a remaining orbit transfer time and a remaining fuel quantity need to reach the target orbit.

* * * * *

UNITED STATES PATENT AND TRADEMARK OFFICE
CERTIFICATE OF CORRECTION

PATENT NO. : 7,246,775 B1
APPLICATION NO. : 10/903653
DATED : July 24, 2007
INVENTOR(S) : Neil Evan Goodzeit et al.

It is certified that error appears in the above-identified patent and that said Letters Patent is hereby corrected as shown below:

In column 3, line 54, replace equation "$u \text{ II } M^T \lambda$" with -- $u \parallel M^T \lambda$ --.

In column 4, line 37, replace "matrix Z" with -- matrix Q --.

Signed and Sealed this

Twenty-seventh Day of May, 2008

JON W. DUDAS
*Director of the United States Patent and Trademark Office*